United States Patent

[11] 3,560,666

[72] Inventor Jack Bookman
Orangeburg, N.Y.

[21] Appl. No. 759,280
[22] Filed Sept. 12, 1968
[45] Patented Feb. 2, 1971
[73] Assignee Telectronics Corporation of America
New York, N.Y.
a corporation of New York

[54] SINGLE DRIVE DUAL CASSETTE TAPE RECORDER WITH RADIO AND TAPE DUPLICATING
4 Claims, 7 Drawing Figs.

[52] U.S. Cl. .......... 179/100.11, 179/100.2
[51] Int. Cl. .......... G11b 5/86, G11b 15/28, G11b 31/00
[50] Field of Search .......... 179/100.11, 100.12, 100.23, 100.2B, 100.2F; 226/(Inquired); 242/(Inquired)

[56] References Cited

UNITED STATES PATENTS

| | | | |
|---|---|---|---|
| 3,295,853 | 1/1967 | Cheng | 179/100.2 |
| 3,400,227 | 9/1968 | Lear | 179/100.11 |
| 3,247,328 | 4/1966 | Mitchell | 179/100.2 |
| 3,294,917 | 12/1966 | Lempert | 179/100.11 |

OTHER REFERENCES

Tremaine H. W. " The Audio Cyclopedia" H. W. Jams & Co., N.Y. (1959) p. 235, paragraph 9.1; copy in Gr 230

*Primary Examiner*—Bernard Konick
*Assistant Examiner*—Raymond F. Cardillo, Jr.
*Attorney*—Kenneth S. Goldfarb

ABSTRACT: A cassette-type tape recorder comprising first and second cassette receiving means provided in spaced relationship to each other with a pair of magnetic playback assemblies operatively positioned with respect thereto. Single drive means are provided which are selectively operatively connected to each of the cassette receiving means, and controlling means are provided for selective actuation of the playback assemblies.

INVENTOR.
JACK BOOKMAN
BY Kenneth S. Goldfarb

INVENTOR.
JACK BOOKMAN

BY Kenneth S. Goldfarb

SINGLE DRIVE DUAL CASSETTE TAPE RECORDER WITH RADIO AND TAPE DUPLICATING

More recently there has become available to both the professional and serious amateur recording enthusiast unitary, highly complex, sophisticated and expensive recording equipment for the accomplishment of the above ends.

One of the most recent developments in the tape recording and player fields has been the compact cassette cartridge recorders, which cartridge recorders, due to their relatively low price, have become a favorite of the teenagers because of the fact that most of the record manufacturers are now making available popular music on prerecorded compact cassette cartridges at prices competitive with 45 and 33 r.p.m. phonograph records.

For the teenager in particular, there has opened up an entire new form of entertainment since the compact cassette cartridge tape recorders are small in size, are light in weight and exceptionally portable, and in addition these units are battery operated. Since the cassettes are sealed units, once recorded they can be readily taken almost anyplace.

The present invention relates generally to tape recorders and more particularly to a rerecording cassette type magnetic tape recorder.

In the past various types of magnetic recordings have been introduced for home use which enabled the home recording enthusiast to record his own materials. However, if the hobbyist desired to edit or correct the previously recorded material it was necessary for him to purchase or obtain a second recording machine in order to effectuate editing or rerecording after the initial recording had been made so as to be able to accomplish the often desirable editing, and dubbing both in and out of certain desirable or undesirable segments of the previously recorded material. In order to accomplish the desired editing it was necessary to playback the first recording on the first recording machine and at the same time to simultaneously rerecord the material on a second recording machine. The above process was utilized for many years by both professionals and amateurs in order to edit their tapes or the like.

Due to the inherent nature of magnetic tape, it has become readily obvious to persons using these recorders that the purchase of prerecorded tapes of current popular music is particularly expensive in that blank or unrecorded cassette cartridges can generally be purchased for approximately one-fourth the price of a prerecorded cassette cartridge. The user is also aware of the fact that virtually all of the popular music which he desires is constantly played over both AM and FM radio, and that the radio program can be recorded by the cassette cartridge tape recorders.

Heretofore, the main drawback to recording directly from radio programs resided in the fact that the radio programs are replete with commercials and chatter by the disc jockeys. In addition, radio programs may contain certain selections which are undesirable to the listener. As a result of the aforementioned difficulties in rerecording and editing, this practice has not become as popular as it undoubtedly would if editing were simplified and the cost thereof reduced.

Accordingly, it is the primary object of the present invention to provide a cassette cartridge recording machine having provision therein for editing and duplicating of previously recorded materials.

Further, it is an object of this invention to provide a single cassette cartridge recording machine having a plurality of cassette cartridge receiving means formed therein for receiving a plurality of cassette cartridges.

Still further, it is an object of this invention to provide a unitary cassette cartridge recording machine having radio receiving means therein for direct transcription upon one cassette of program material received by the radio receiving means.

Another object of the invention resides in the provision of a unitary cassette cartridge recording machine utilizing a single drive means to activate a plurality of cassette cartridges with selective control means for selectively operating the plurality of cassette cartridges in a different mode of operation simultaneously.

Another object of the invention is to provide a highly portable entertainment device utilizing a plurality of cassette cartridges and an internal radio for the purpose of recording materials received over the radio and editing the same, which device is provided with interlock means thereon for selectively controlling the mode of operation thereof.

A further object of the invention is to provide a cassette cartridge recording machine which will be inexpensive to manufacture, easy to use and which will provide the hobbyist with simple and inexpensive means for recording and editing of tapes.

These, together with other ancillary objects, features and advantages of the invention will become apparent as the specification continues with reference to the accompanying drawings wherein.

Figures 1, 2:
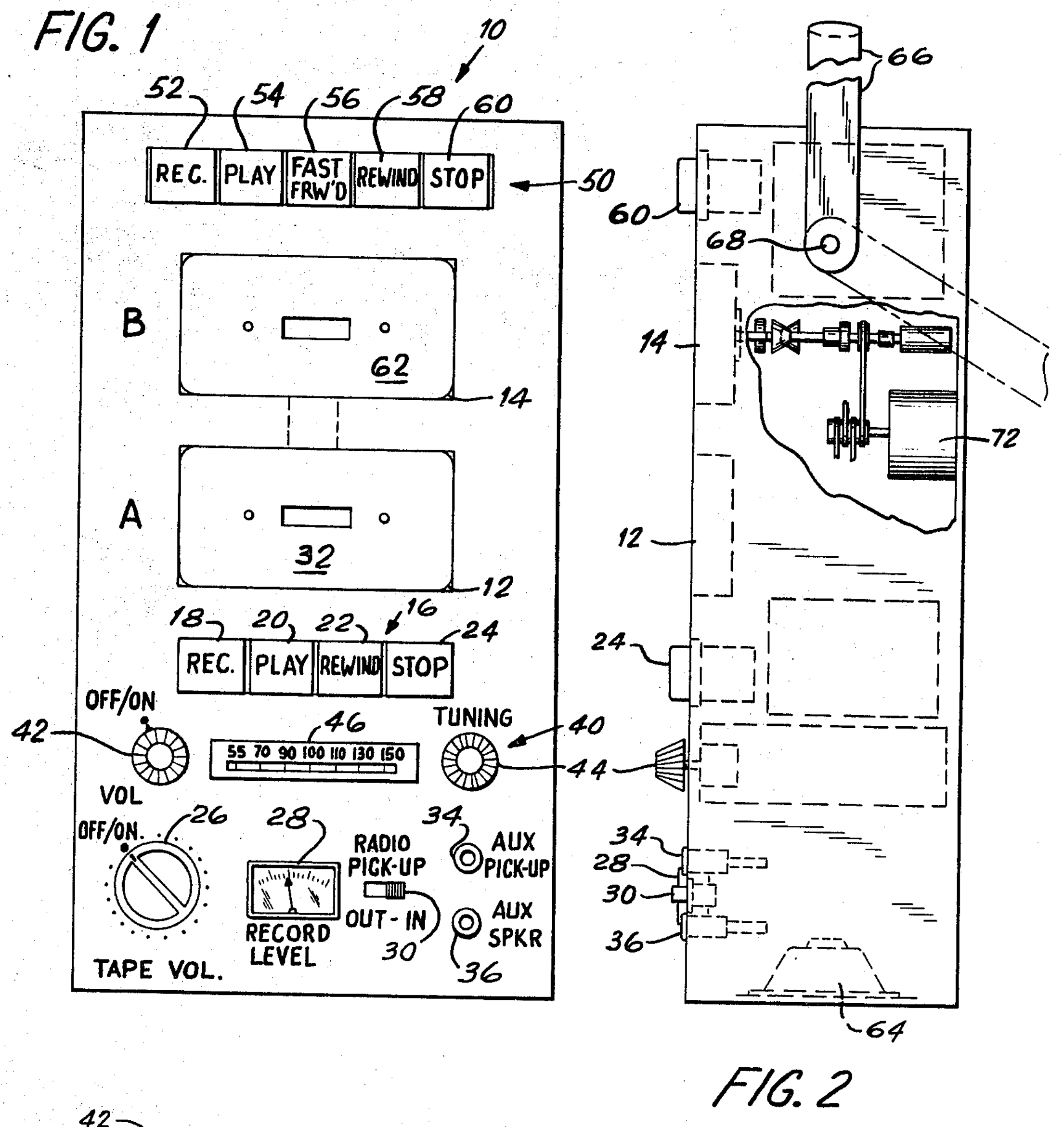
FIG. 1 is a top plan view of the cassette cartridge recorder of the invention.
FIG. 2 is a side elevational view in partial section for purposes of clarity taken from the right of FIG. 1 and showing the combined handle and stand means.
Figure 3:
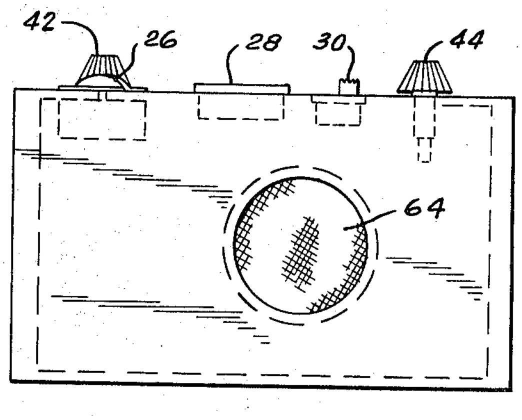
FIG. 3 is an end view taken from the bottom of FIG. 1 showing the location of the speaker and other controls.
Figure 4:
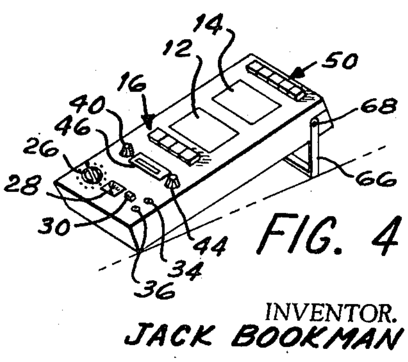
FIG. 4 is a perspective view of the cassette cartridge recorder showing the operation of the combined handle and recorder stand of FIG. 2.

In accordance with the accompanying drawings there is shown a cassette-type tape recorder generally designated by reference numeral 10 which recorder is provided with a plurality of cassette receiving means 12 and 14 respectively. A first mode control means control panel 16 having a record control 18, a playback control 20, a rewind control 22 and instantaneous stop control means 24 being located thereupon. The first magnetic recording playback assembly being operatively connected to the cassette receiving means 12. A combined on/off/volume control switch 26 is provided on the face panel of the tape recorder as is the record level indicator 28. A two position radio pickup control switch 30 is provided for the purpose of selectively feeding radio signals into the first magnetic recording assembly which cooperates with the cassette 32 which is removably located in the cassette receiving means 12. An auxiliary pickup jack 34 is provided for use with a microphone or the like. Further, there is provided an auxiliary speaker plug 36 into which plug a remote or extension speaker or earphone can be attached as is well known.

The cassette tape recorder 10 has included therein as an integral part thereof a radio receiver means 40 having an on/off/volume control switch 42, a tuning control knob 44 and a tuning dial indicator 46.

The second magnetic recording playback assembly is operatively positioned so as to function with the second cassette receiving means 14. A second mode control means control panel 50 having a record control 52, a playback control 54, a fast forward control 56, a rewind control 58 and a stop control 60 is provided which second mode control panel 50 serves to control the second magnetic recording playback assembly. A second cassette cooperates with the second magnetic recording playback assembly, which cassette 62 is removably insertable in the cassette receiving means 14.

A speaker 64 is located in the recorder housing which speaker is connected to the playback assemblies of both the first and second recording assemblies as well as to the radio receiver means 40.

A handle 66 is pivotally mounted at 68 to the recorder housing which handle serves both as a carrying handle and as a stand for maintaining the recorder 10 at the optimum position for operation when the recorder 10 is placed down for use on a flat surface, such as a table or the like.

Figure 5:
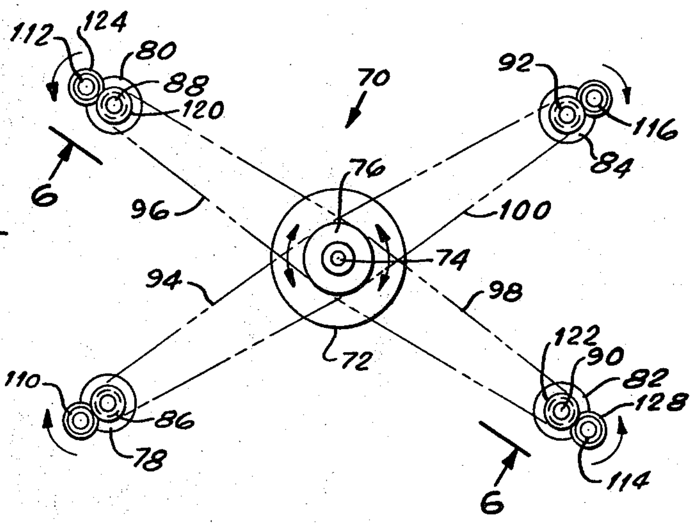
FIG. 5 is a diagrammatic showing of the dual drive mechanism of the invention utilizing a single motor drive means.
Figure 6:
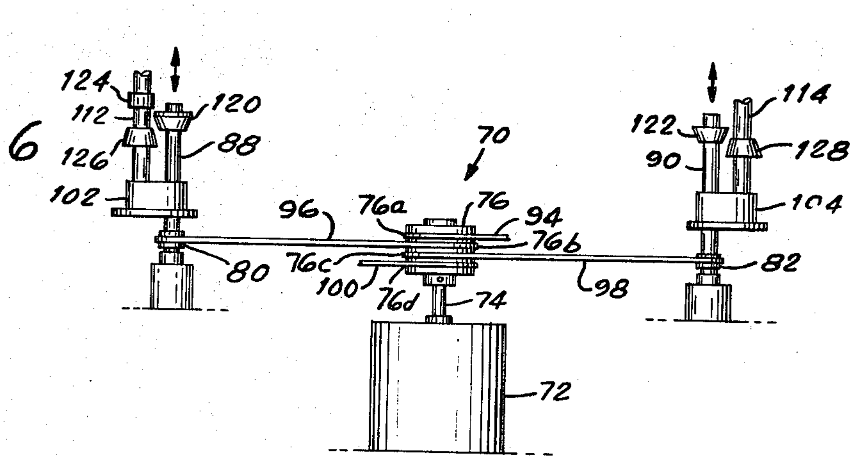
FIG. 6 is a side elevational view of the dual drive mechanism employed in the invention taken along line 6–6 of FIG. 5 looking in the direction of the arrows; and, FIG. 7 is an enlarged detail view of the drive mechanism illustrated at the left of FIG. 6.
Figure 7:
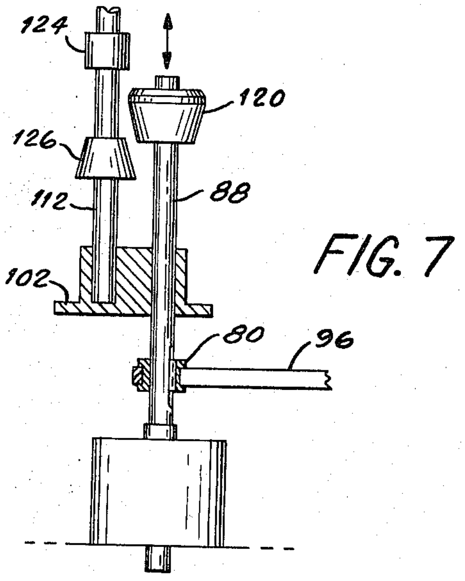

Referring now to FIGS. 5 and 6, in particular there is shown the drive means generally designated as 70 having a single motor 72 which motor 72 is electrically reversible. Extending from the motor 72 is a drive shaft 74 to which there is attached a motor pulley 76 which pulley 76 is provided for distinctive belt drive means 76*a*, 76*b*, 76*c* and 76*d*. The pulley 76 also serves as a flywheel.

Idler pulleys 78, 80, 82 and 84 are provided, each of which are affixed to freely rotatable shafts 86, 88, 90 and 92 respectively. The idler pulleys 78, 80, 82 and 84 are connected to the pulley 76 by means of drive belts 94, 96, 98, and 100 respectively. Drive shaft support means are provided in conjunction with each of the rotatable shafts, 86, 88, 90 and 92 which support means support the sprocket drive shafts 110, 112, 114 and 116 respectively which sprocket drive shafts engage the shaft receiving means on the tape cassettes 32 and 62 respectively. The drive shafts 86, 88, 90 and 92 are slideably mounted for up and down movement according to electrical impulses by solenoid operation as is well known. Capstan idlers 120, 122 are provided on the rotatable shaft 86, 88, 90 and 92 which idlers will control drive bushings on the sprocket drive shafts. For the purposes of simplicity only, several of the drive bushings are illustrated, those being numbered 124, 126 and 128 respectively.

It is to be noted that belts 96 and 100, together with the respective associate components, are utilized to drive cassette 62 while belts 94 and 98, together with the respective associated components, are utilized to drive cassette 32.

In operation in order to utilize the radio alone, the stop buttons 24 and 60 are depressed and the radio 40 is turned on and operated in the normal fashion.

If the tape recorder is to be utilized using a microphone the microphone is plugged into the auxiliary pickup 34. The tape volume control 26 is turned on and the record button 18 is depressed actuating the drive means 70 and causing drive shaft 92 to engage the sprocketed drive shaft 114 through the associated Capstan idler and drive bushing thereby advancing the tape within cassette 32 in the normal manner. The correct recording volume is established by adjusting the tape volume control 26 so as to maintain the record level indicator 28 within the proper recording range.

If it is desired to record off the radio 40 the microphone is removed from the auxiliary pickup plug 34 and the radio pickup control 30 placed in the position. The recording function is controlled in the well-known manner by the mode controls 18, 20, 22 and 24.

In the event that it is desired to rerecord material from cassette 32 and to edit the same so as to eliminate commercials or the like, the following procedures are followed.

The cassette 32 containing the material which is desired to be re-recorded is placed into the first cassette receiver means 12. A second cassette 62 is placed in the second cassette receiving means 14. The radio 40 is turned off, the radio pickup control 30 is placed in the out position and the first set of mode controls 16 is placed on off by depressing the stop button 24.

Record button 52 is depressed on the second mode control means 50, the depression of which activates the drive means causing drive sprocket shafts 114 and 116 to operate simultaneously. Depression of the record control 52 automatically activates the playback mechanism of the first magnetic recording playback assembly and the record means of the second magnetic recording playback assembly. Further, depression of the record control 52 also activates the speaker 64 so that the operator can monitor what is being recorded on the magnetic recording tape in the cassette 62. When the desired material has been recorded on the tape in cassette 62 the stop control 60 is depressed which stops the playback process from the first magnetic recording playback assembly and the recording process on the second magnetic recording assembly. The first cassette 32 may then be advanced until further material which is desired is reached by depressing the play control 20 of the first mode control means 16 or a different cassette may be inserted into the first cassette receiving means 12 which cassette contains desireable material to be recorded.

The above process can be repeated as often as is required so as to obtain the desired material on the magnetic tape in cassette 62. Likewise, cassette 62 may be played back independently of cassette 32 by depressing the play control 54, thereby assuring the proper content on the magnetic tape in cassette 62.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A cassette-type tape recorder comprising, in combination, first cassette receiving means, second cassette receiving means located in spaced relation to said first cassette receiving means, a first magnetic recording-playback assembly adjacent said first cassette receiving means for engagement with a cassette disposed in said first cassette assembly means, a second magnetic recording-playback assembly operatively positioned with respect to said second cassette receiving means, single drive means selectively operatively connected to said first and said second cassette receiving means, said drive means comprising a single motor rotating at a constant speed, a belt drive connected to said motor having receiving means thereupon for receiving four independent drive belts, each of said drive belts simultaneously and separately driving independently mounted slidable drive shafts, independent solenoid means operatively connected to each of said drive shafts, said solenoid means being adapted to selectively position said drive shaft into operable relationship with said tape drive shaft to energize said tape cassettes, said drive shafts being provided with Capstan idlers thereupon for selectively operably engaging drive bushings on said tape drive shafts, first mode control means for operating only said first magnetic recording-playback assembly, a second mode control means for operating both said first and said second magnetic recording-playback assemblies, interlock means connected to said second mode control means for rendering said first mode control means inoperative upon utilization of said second mode control means, means interconnecting said first and said second magnetic recording-playback assemblies for permitting playback by said first magnetic recording-playback assembly and simultaneous rerecording by said second magnetic recording-playback assembly, and audio amplification means connected to said first and said second magnetic recording-playback assemblies for selectively monitoring both said first and said second magnetic recording-playback assemblies.

2. A tape recorder in accordance with claim 1, including radio receiver means for receiving a radio signal from a remote signal source, means for recording audio signals received by said radio receiver means directly onto magnetic recording tape disposed in said first cassette receiving means through said first magnetic recording-playback assembly, said radio receiver means being actuatable for direct recording through said magnetic recording-playback assembly by radio receiver means.

3. A tape recorder in accordance with claim 2, wherein auxiliary pickup means are provided for activation by a signal from a remote source distinct from said remote signal source means, and means in said first magnetic recording-playback assembly for utilizing said radio receiver means and said auxiliary input means simultaneously.

4. A tape recorder in accordance with claim 2, wherein speaker means are provided for monitoring the output of said first and said second magnetic recording-playback assemblies.